(12) United States Patent
Shimokawa et al.

(10) Patent No.: US 8,711,447 B2
(45) Date of Patent: Apr. 29, 2014

(54) IMAGE SCANNING APPARATUS AND IMAGE FORMING APPARATUS

(75) Inventors: Koji Shimokawa, Shizuoka-ken (JP); Sueo Ueno, Shizuoka-ken (JP); Katsuya Nagamochi, Tokyo (JP); Hiroyuki Shiraishi, Shizuoka-ken (JP); Yusuke Hashizume, Chiba-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 406 days.

(21) Appl. No.: 13/110,634

(22) Filed: May 18, 2011

(65) Prior Publication Data

US 2011/0286056 A1 Nov. 24, 2011

Related U.S. Application Data

(60) Provisional application No. 61/346,358, filed on May 19, 2010.

(51) Int. Cl.
*H04N 1/04* (2006.01)

(52) U.S. Cl.
USPC .......................... 358/483; 358/482; 358/474

(58) Field of Classification Search
USPC .................. 358/483, 482, 474, 505, 512–514; 250/208.1, 234–236, 239, 216
See application file for complete search history.

(56) References Cited

U.S. PATENT DOCUMENTS

| 5,204,755 | A  | * | 4/1993  | Taga et al.    | 358/400 |
| 6,323,891 | B1 | * | 11/2001 | Kitani et al.  | 347/263 |
| 8,274,101 | B2 | * | 9/2012  | Venezia et al. | 257/228 |
| 2013/0314756 | A1 | * | 11/2013 | Amemiya et al. | 358/497 |

FOREIGN PATENT DOCUMENTS

| JP | 07-212633 A   |   | 8/1995 |
| JP | 07212633 A    | * | 8/1995 |
| JP | 2005057149 A  | * | 3/2005 |

* cited by examiner

*Primary Examiner* — Cheukfan Lee
(74) *Attorney, Agent, or Firm* — Patterson & Sheridan, L.L.P.

(57) ABSTRACT

An image scanning apparatus includes an image pickup device, a substrate connected to a terminal of the image pickup device, a heat radiation plate which is disposed between the image pickup device and the substrate and one surface of which contacts the image pickup device, and an insulating sheet which is sandwiched between the heat radiation plate and the substrate, respective surfaces of which contact the heat radiation plate and the substrate, and which electrically insulates the heat radiation plate from an electronic component on the substrate.

18 Claims, 6 Drawing Sheets

IMAGE SCANNING APPARATUS AND IMAGE FORMING APPARATUS

CROSS-REFERENCE TO RELATED APPLICATIONS

This application is based upon and claims the benefit of priority from: U.S. provisional application 61/346,358, filed on May 19, 2010; the entire contents all of which are incorporated herein by reference.

FIELD

Embodiments described herein relate generally to a temperature countermeasure technique of an image scanning apparatus used in an image forming apparatus.

BACKGROUND

A CCD image sensor (Charge Coupled Device Image Sensor) is used in an image scanning apparatus of an image forming apparatus. Since the allowable upper limit temperature of the CCD image sensor is about 65 degrees and is low as compared with another IC (Integrated Circuit), temperature countermeasures are required.

In recent years, the engine speed of an image forming apparatus becomes high, and the fixing temperature of a fixing device becomes high. Thus, the temperature of the CCD image sensor also becomes high by radiation heat from the fixing device. As countermeasures against this, a method of cooling the CCD image sensor by a cooling FAN is known. However, in this method, the installation area of the FAN and the power for driving the FAN must be secured, and the cost is high.

DETAILED DESCRIPTION

According to an embodiment, an image scanning apparatus includes an image pickup device, a substrate connected to a terminal of the image pickup device, a heat radiation plate which is disposed between the image pickup device and the substrate and one surface of which contacts the image pickup device, and an insulating sheet which is sandwiched between the heat radiation plate and the substrate, respective surfaces of which contact the heat radiation plate and the substrate, and which electrically insulates the heat radiation plate from an electronic component on the substrate.

In the following embodiment, a heat radiation plate is provided between a CCD image sensor and a CCD substrate on which the CCD image sensor is mounted. The heat of the CCD image sensor is radiated from the heat radiation plate, so that the temperature of the CCD image sensor is decreased. By this, a high temperature suppressing countermeasure becomes possible, and a FAN, a harness for FAN connection and an IC for FAN driving become unnecessary. Thus, cooling of an image scanning apparatus can be inexpensively performed.

Figure 1:
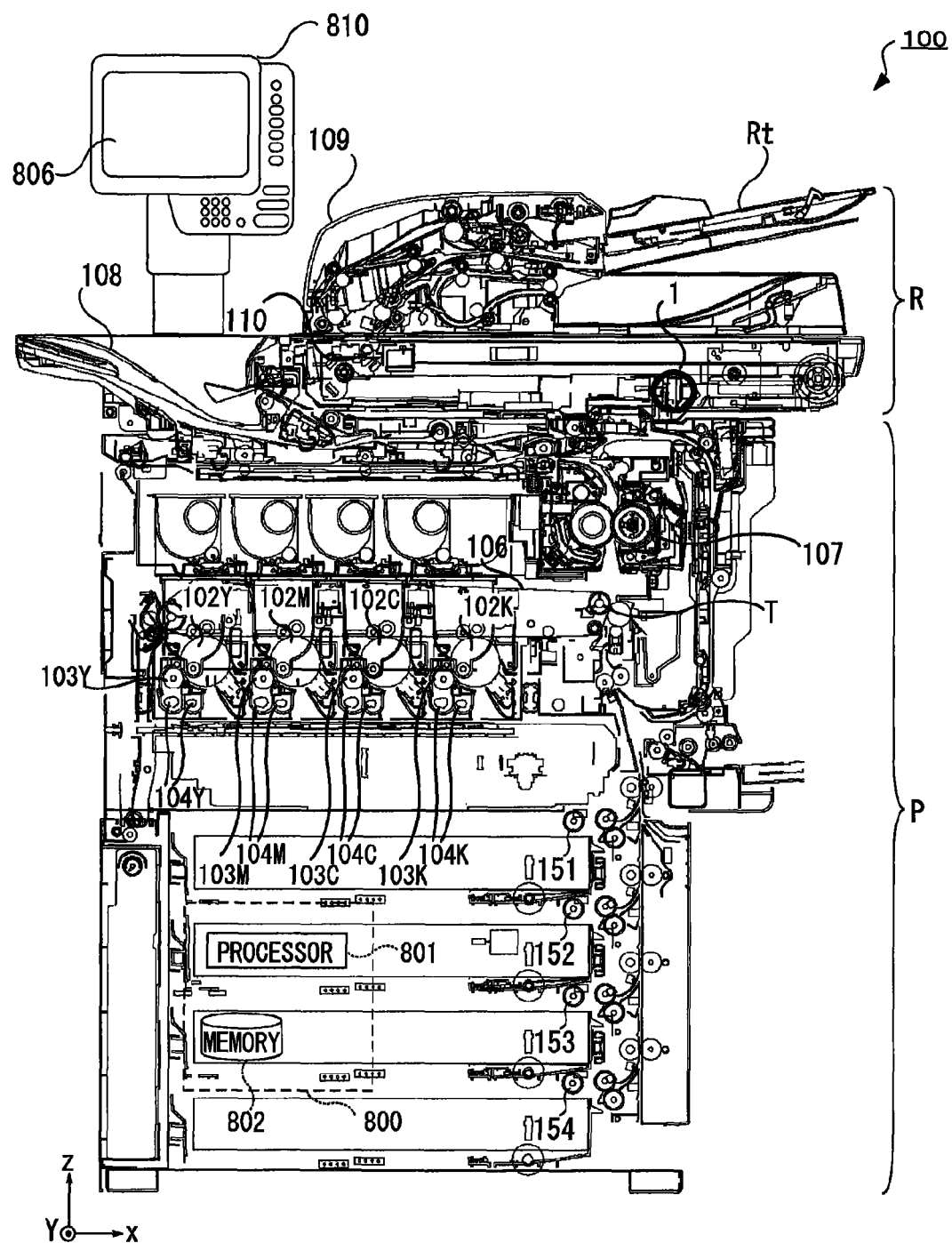
FIG. 1 is a view showing a structural example of an image forming apparatus.

FIG. 1 is a vertical sectional view showing a schematic structure of an image forming apparatus (MFP: Multi Function Peripheral) in this embodiment. As shown in FIG. 1, the image forming apparatus 100 of this embodiment includes a reading part R and an image forming part P.

The reading part R has a function to scan and read an image of a sheet document and a book document. The reading part R includes a scanning optical system 110 including plural reflecting mirrors and an image scanning apparatus 1, and includes an auto document feeder (ADF) 109 which can automatically feed a document to a specified placement position. An image of a document placed on a document tray (specified document placement table) Rt and automatically fed by the auto document feeder 109 or a document placed on a not-shown document table is read by the image scanning apparatus 1 through the scanning optical system 110.

The image forming part P has a function to form a developer image on a sheet based on the image read from the document by the reading part R or image data transmitted from an external equipment to the image forming apparatus 100. Besides, the image forming part P includes pickup rollers 151 to 154, photoreceptors 102Y to 102K, developing rollers 103Y to 103K, mixers 104Y to 104K, an intermediate transfer belt 106, a fixing device 107 and a discharge tray 108.

Besides, the image forming apparatus 100 includes an image processing part 800 including a processor 801 as an arithmetic processing unit (for example, a CPU (Central Processing Unit), an MPU (Micro Processing Unit)) and a memory 802 constructed of a volatile storage device and a nonvolatile storage device. The processor 801 serves to perform various processes in the image forming apparatus 100, and also serves to realize various functions by loading programs stored in the nonvolatile storage area of the memory 802 into the volatile storage area of the memory 802 and executing the loaded programs. The memory 802 can be constructed of, for example, a RAM (Random Access Memory), a ROM (Read Only Memory), a DRAM (Dynamic Random Access Memory), an SRAM (Static Random Access Memory), a VRAM (Video RAM), a hard disk drive or the like, and serves to store various information and programs used in the image forming apparatus 100.

The image forming apparatus 100 includes a control panel 810 provided with a touch panel display 806. The control panel 810 receives instructions from a user and displays processing content to the user.

Hereinafter, the outline of a copy process will be described as an example of processes in the image forming apparatus 100 of the embodiment.

First, a sheet picked up from a cassette by the pickup rollers 151 to 154 is supplied to a sheet conveyance path. The sheet supplied to the sheet conveyance path is conveyed in a specified conveyance direction by plural roller pairs.

Images of plural sheet documents continuously automatically fed by the auto document feeder 109 are read by the image scanning apparatus 1 through the scanning optical system 110.

Next, the image processing part 800 performs an image processing on the image data read from the document in the reading part R. Based on the data after the image processing, electrostatic latent images are formed on the photosensitive surfaces of the photoreceptors 102Y, 102M, 102C and 102K for transferring developer images of Y (yellow), M (magenta), C (cyan) and K (black) to the sheet.

Next, developers agitated by the mixers 104Y to 104K in the developing unit are supplied by developing rollers (so-called mag rollers) 103Y to 103K to the photoreceptors 102Y to 102K on which the electrostatic latent images are formed as stated above. By this, the electrostatic latent images formed on the photosensitive surfaces of the photoreceptors are visualized.

The developer images formed on the photoreceptors in this way are transferred (so-called primary transfer) onto the belt surface of the intermediate transfer belt 106, and the developer images conveyed by the rotation of the intermediate transfer belt are transferred onto the conveyed sheet at a specified secondary transfer position T.

The developer images transferred on the sheet are heated and fixed to the sheet by the fixing device 107. The sheet on which the developer images are heated and fixed is conveyed in the conveyance path by plural conveyance roller pairs, and is sequentially discharged onto the discharge tray 108.

First Embodiment

Figure 2:
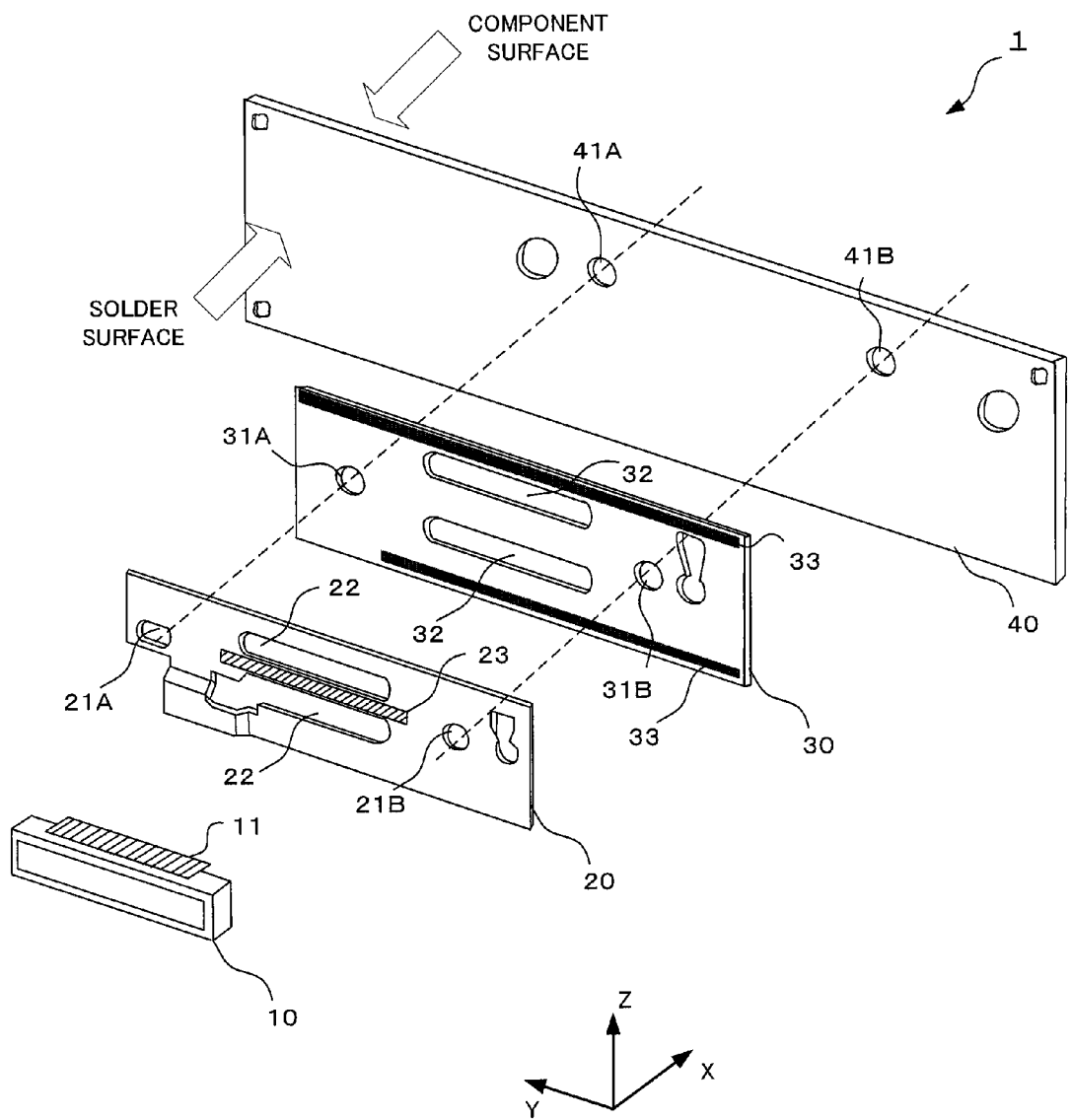
FIG. 2 is a view showing a structural example (before assembly) of an image scanning apparatus of a first embodiment.
Figure 3:
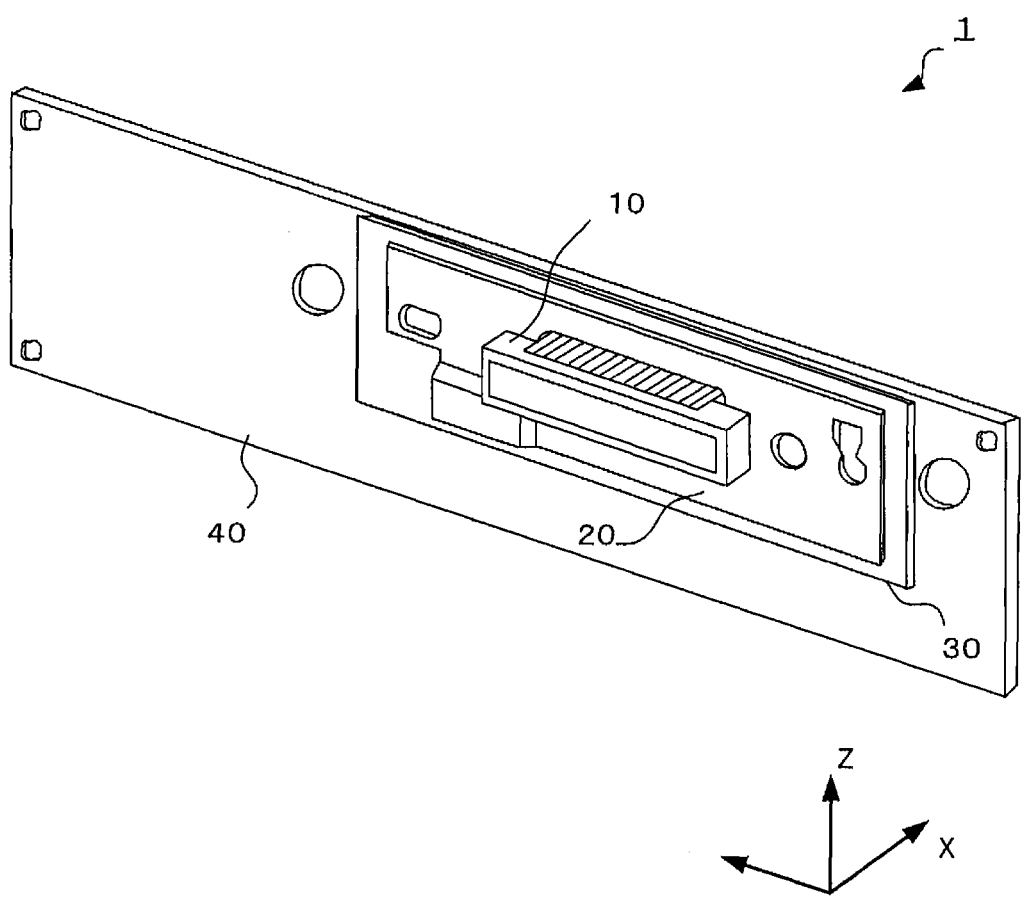
FIG. 3 is a view showing a structural example (after assembly) of the image scanning apparatus.

Next, a structure of the image scanning apparatus 1 will be described with reference to FIG. 2 and FIG. 3. FIG. 2 is a view showing a state before assembly of the image scanning apparatus 1, and FIG. 3 is a view showing a state after the assembly. The image scanning apparatus 1 includes a CCD image sensor 10, a heat radiation plate 20, an insulating sheet 30 and a CCD substrate 40.

The CCD image sensor 10 is an image pickup device to convert an image incident from the scanning optical system 110 into an electric signal. The CCD image sensor 10 includes plural pins (hereinafter referred to as a pin line 11) connected to the CCD substrate 40.

The heat radiation plate 20 is a metal plate, one surface thereof contacts the CCD image sensor 10, and the other surface contacts the insulating sheet 30. The heat radiation plate 20 radiates heat generated from the CCD substrate 40 and heat generated from the CCD image sensor 10 to the outside.

The insulating sheet 30 is sandwiched between the heat radiation plate 20 and the CCD substrate 40, and electrically insulates the heat radiation plate 20 from an electronic component arranged on the CCD substrate 40. One surface of the insulating sheet 30 contacts the heat radiation plate 20, and the other surface contacts the CCD substrate 40. A member containing polyester having high electric insulation properties is used as the insulating sheet 30. In the first embodiment, in order to ensure the electric insulation, the insulating sheet 30 is made to have such a shape that the area of the surface thereof is larger than the area of the surface of the heat radiation plate 20.

The pin line 11 of the CCD image sensor 10 is connected to the CCD substrate 40, and the CCD image sensor 10 is attached to the substrate.

The heat radiation plate 20 includes positioning holes 21A and 21B, and the insulating sheet 30 includes positioning holes 31A and 31B. Besides, the CCD substrate 40 includes positioning holes 41A and 41B. The positions of the positioning holes are made coincident to each other, so that the heat radiation plate 20, the insulating sheet 30 and the CCD substrate 40 are assembled so as to prevent them from being shifted from definite positions. In this embodiment, the diameter of each of the positioning holes 21A and 21B and the positioning holes 41A and 41B is made 5 mm, and the diameter of each of the positioning holes 31A and 31B is made 3 mm. A hole 22 provided in the heat radiation plate 20 and a hole 32 provided in the insulating sheet 30 are holes for allowing the pin line 11 to pass through to the CCD substrate 40. In view of electric insulation mounting, the hole 32 is smaller than the hole 22.

As stated above, the positioning holes are provided at the same position, and the CCD substrate 40, the insulating sheet 30 and the heat radiation plate 20 are certainly positioned, so that the electric insulation is ensured. Besides, the holes for allowing the pin line 11 to pass through are provided in the insulating sheet 30 and the heat radiation plate 20, and the inner wall of each of the holes is made not to contact the side wall of each of the pins of the pin line 11, so that the electric insulation is ensured.

An adhesive part 23 of the heat radiation plate 20 is a part where the CCD image sensor 10 and the heat radiation plate 20 are fixed. An adhesive part 33 of the insulating sheet 30 is a part where the heat radiation plate 20 and the insulating sheet 30 are fixed. In this embodiment, a double-sided adhesive tape is bonded to each of the adhesive part 23 and the adhesive part 33, and the CCD image sensor 10, the heat radiation plate 20 and the insulating sheet 30 are fixed. Incidentally, a similar adhesive part is provided on the CCD substrate 40, and the insulating sheet 30 and the CCD substrate 40 are fixed in this part.

Next, an assembling method of the image scanning apparatus 1 will be described. When the heat radiation plate 20 contacts an electronic component and a pattern on the CCD substrate 40, there is a possibility that a short occurs. Thus, high accuracy positioning is required. Here, the assembling method taking the positioning into consideration will be described. First, positioning tools having the same diameter (diameter of 5.0 mm) as the positioning holes 41A and 41B are inserted into the two positioning holes 41A and 41B of the CCD substrate 40. Similarly, the tools are inserted into the respective positioning holes of the heat radiation plate 20 and the insulating sheet 30, and the heat radiation plate 20 and the insulating sheet 30 are attached. By doing so, the high accuracy positioning becomes possible.

In this embodiment, the two positioning holes are provided for each. However, when the shape of the positioning hole is made a shape, for example, a rectangle such that the heat radiation plate 20, the insulating sheet 30 and the CCD substrate 40 are not mutually rotated when the tool is inserted, the number of the positioning holes may be one.

Besides, the CCD substrate 40 and the insulating sheet 30, and the insulating sheet 30 and the heat radiation plate 20 are fixed at the respective adhesive parts, and even if the tool is removed after the CCD image sensor 10 is attached, the heat radiation plate 20 and the like are not moved.

Here, the heat radiation plate 20 will be described in more detail. In this embodiment, SECC (electrogalvanized sheet steel) is used for the heat radiation plate 20. In the case of the SECC, since the thermal conductivity in the thickness direction with respect to a glass epoxy substrate is high, as the heat radiation plate 20 becomes thick, the heat radiation effect becomes high. However, when the heat radiation plate is excessively thick, since the pin line 11 of the CCD image sensor 10 does not reach a component surface side of the CCD substrate 40, the CCD image sensor 10 can not be mounted. Accordingly, the thickness (thickness in the X-axis direction) of the heat radiation plate 20 is made to satisfy the following equation. Incidentally, the length of the pin line 1 protruding from the component surface of the CCD substrate 40 is 1 mm or more.

(thickness of the heat radiation plate 20)>=(effective length of the pin line 11)−(thickness of the CCD substrate 40)−(thickness (0.5 mm or more) of the insulating sheet 30)−(protrusion length (1 mm))

Of course, the respective lengths of the above equation are lengths in the X-axis direction.

Figure 4A:
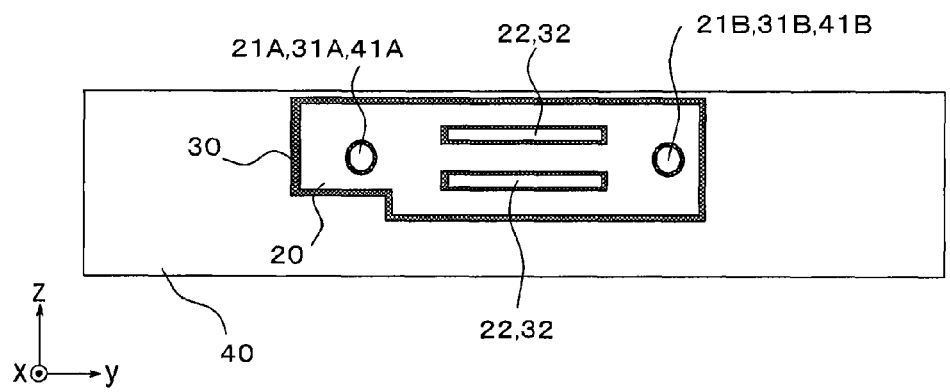
FIG. 4A is a plan view showing the image scanning apparatus before a CCD image sensor is attached.
Figure 4B:
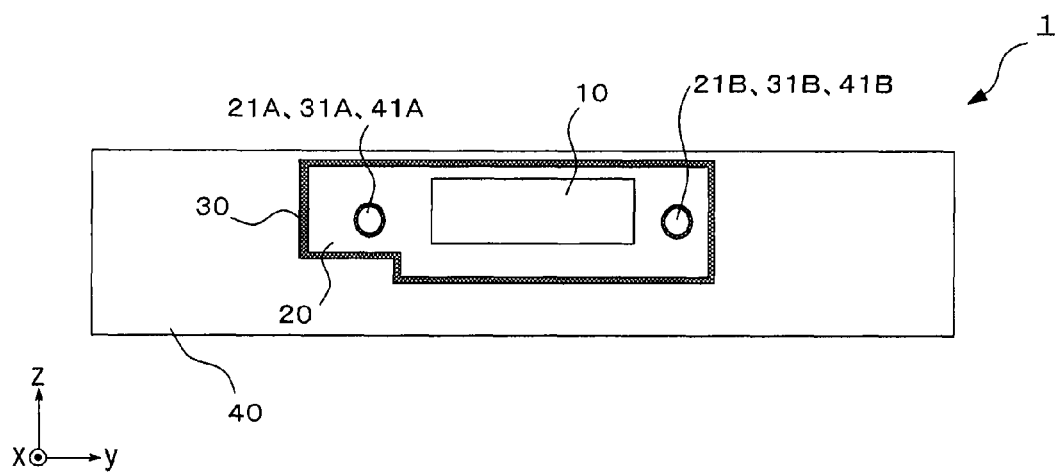
FIG. 4B is a plan view showing the image scanning apparatus after the CCD image sensor is attached.

FIGS. 4A and 4B are plan views when the image scanning apparatus 1 is seen in the X-axis direction. FIG. 4A is a plan view before the CCD image sensor 10 is attached, and FIG. 4B is a plan view after the CCD image sensor 10 is attached. A shaded area of FIG. 4A and FIG. 4B is a surface area of the insulating sheet 30.

As shown in FIG. 4A and FIG. 4B, the insulating sheet 30 has such a shape as to project from the heat radiation plate 20 to the outside. In this embodiment, the shape is such that the size of the projection to the outside is 1 mm or more. When such a shape is adopted, the heat radiation plate 20 does not contact the CCD substrate 40.

Second Embodiment

In the first embodiment, the description is made on the case where the insulating sheet is provided for the whole surface of the heat radiation plate so that the heat radiation plate does not contact the CCD substrate. The insulating sheet is required to ensure the electric insulation between the heat radiation plate and the CCD substrate. However, when the insulating sheet is provided, the heat radiation effect is reduced, and heat radiation is prevented.

In a second embodiment, a description will be made on a case where in order to further raise the heat radiation effect, an area where there is no electronic component is provided on a CCD substrate, and a heat radiation plate directly contacts the CCD substrate in the area.

Figure 5:
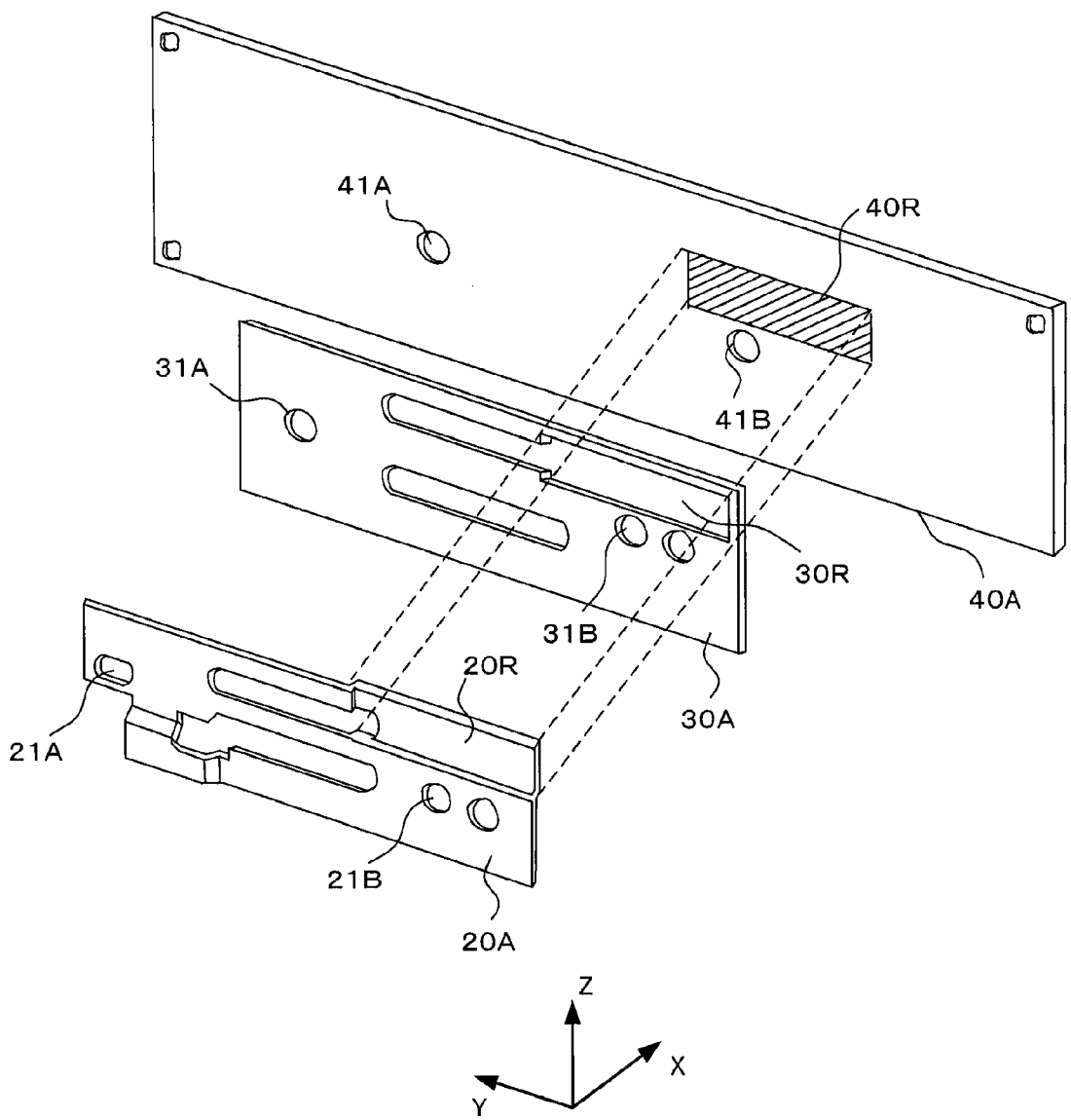
FIG. 5 is a view showing an example of a heat radiation plate, an insulating sheet and a CCD substrate in a second embodiment.

FIG. 5 is a view showing an example of a heat radiation plate, an insulating sheet and a CCD substrate in the second embodiment. A heat radiation plate 20A has such a shape that an area 20R as a partial area of the heat radiation plate protrudes to an insulating sheet 30A side and a CCD substrate 40A side by the thickness (thickness in the X-axis direction) of the insulating sheet 30A. The insulating sheet 30A has such a shape that the sheet is not provided in an area 30R corresponding to the area 20R so that the area R20 of the heat radiation plate 20A directly contacts the CCD substrate 40A. By the shape as stated above, the area 20R as the partial area of the heat radiation plate 20A contacts an area 40R as a partial area of the CCD substrate 40A.

Figure 6:
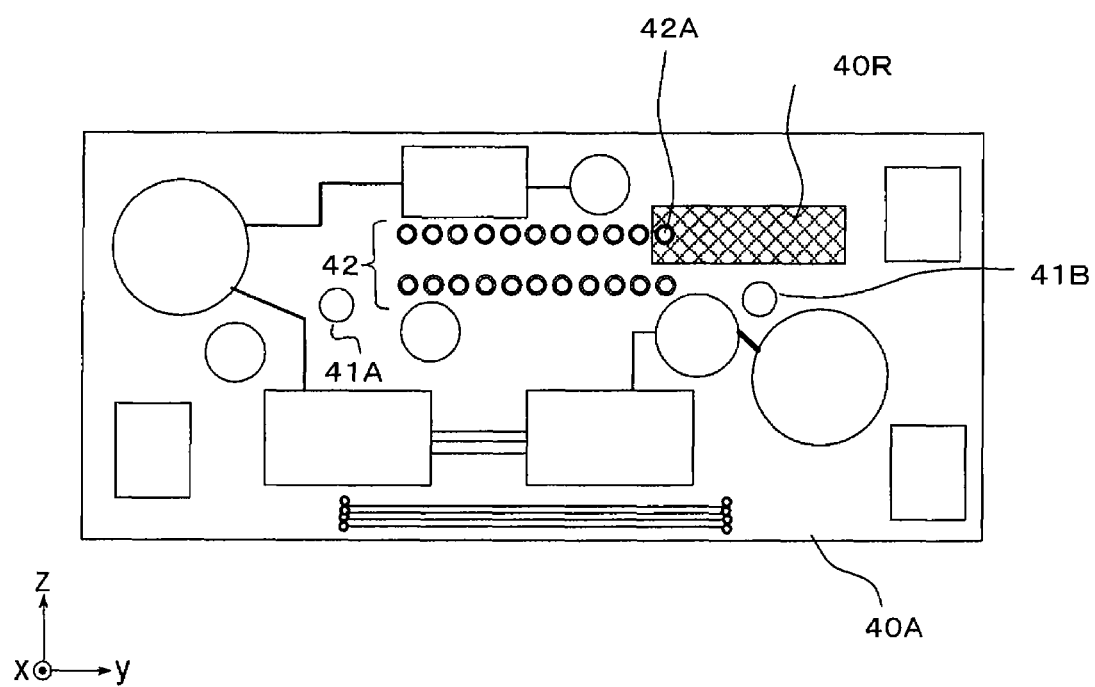
FIG. 6 is a view showing an area where the heat radiation plate contacts the CCD substrate.

FIG. 6 is a plan view (schematic view) when the CCD substrate 40A is seen in the X-axis direction. The CCD substrate 40A includes plural through-holes 42 in which respective pins of a pin line 11 of a CCD image sensor 10 are inserted.

A CCD output stage amplifier (not shown) provided in the CCD image sensor 10 generates a large amount of heat, and is often arranged in the vicinity of a pin (hereinafter referred to as a CCD output pin), from which an image signal is outputted, of the pin line 11. Besides, there is a case where a large current flows through the CCD output pin by the output of the image signal, and the temperature becomes high. From this, a heat radiation countermeasure is particularly required to be taken for the vicinity of the CCD output pin.

Thus, in the second embodiment, in order to efficiently radiate the heat generated in the CCD output stage amplifier and the CCD output pin, an electric component is arranged so that at least a through-hole 42A corresponding to the CCD output pin is included in the area 40R. The other through-holes, and electronic components such as a resist, a mounted component and a pattern are not provided in the area 40R. Incidentally, the reason why the pattern is not provided in the area 40R is that there is a possibility that the pattern is damaged by the attachment of the heat radiation plate 20A.

Similarly, when a surface (solder surface) of the CCD substrate 40A is a projection surface, the area 40R includes an area formed when the output stage amplifier is projected on the surface of the CCD substrate 40A. By doing so, the heat generated from the output stage amplifier of the CCD image sensor 10 can be efficiently radiated.

In the foregoing embodiments, although the description is made while using, as the example, the image scanning apparatus 1 to form a scan image in the image forming apparatus 100, the inner structure of the image scanning apparatus 1 can be applied to any unit as long as the unit uses an image pickup device (the CCD image sensor 10 in the embodiments). As the unit using the image pickup device, various units, such as a unit to take an image in order to inspect formation accuracy of an image on a sheet and a unit to take an image in order to perform calibration, are conceivable. In the foregoing embodiments, although the description is made on the assumption that the image scanning apparatus 1 is provided in the image forming apparatus 100, no limitation is made to the image forming apparatus. For example, the image scanning apparatus can be applied to a camera.

As described above in detail, according to the technique described in this specification, the temperature of the image scanning apparatus can be reduced.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image scanning apparatus comprising:
   an image pickup device;
   a substrate connected to a terminal of the image pickup device;
   a heat radiation plate disposed between the image pickup device and the substrate, a surface of the heat radiation plate contacting the image pickup device; and
   an insulating sheet sandwiched between the heat radiation plate and the substrate, respective surfaces of the insulating sheet contacting the heat radiation plate and the substrate, the insulating sheet electrically insulating the heat radiation plate from an electronic component on the substrate,
   wherein each of the heat radiation plate and the insulating sheet includes a hole through which the terminal of the image pickup device passes, and an inner wall of the hole does not contact a pin side wall of the terminal.

2. The apparatus of claim 1, wherein each of the substrate, the heat radiation plate and the insulating sheet includes one or more holes, and positions of the holes of the substrate, the heat radiation plate and the insulating sheet are coincident to each other.

3. The apparatus of claim 2, wherein a diameter of the one or more holes of the insulating sheet is smaller than a diameter of the one or more holes of the substrate and a diameter of the one or more holes of the heat radiation plate.

4. The apparatus of claim 1, wherein an area of the one or more holes of the insulating sheet is smaller than an area of the one or more holes of the heat radiation plate.

5. The apparatus of claim 1, wherein a thickness of the heat radiation plate satisfies at least (thickness of the heat radiation plate)>=(effective length of a pin of the terminal)−(thickness of the substrate)−(thickness of the insulating sheet)−(protrusion length of the pin of the terminal with respect to the substrate).

6. The apparatus of claim 1, wherein a partial area of a contact surface of the substrate contacts the heat radiation plate.

7. The apparatus of claim 6, wherein the partial area includes a hole connected to at least a portion of a terminal of the image pickup device, the portion of the terminal outputting an image signal.

8. The apparatus of claim 6, wherein the partial area includes an area formed when an output stage amplifier of the image pickup device is projected on the surface of the substrate.

9. The apparatus of claim 1, wherein the heat radiation plate is an electrogalvanized sheet steel.

10. An image forming apparatus comprising:
an image pickup device;
a substrate connected to a terminal of the image pickup device;
a heat radiation plate disposed between the image pickup device and the substrate, a surface of the heat radiation plate contacting the image pickup device; and
an insulating sheet sandwiched between the heat radiation plate and the substrate, respective surfaces of the insulating sheet contacting the heat radiation plate and the substrate, the insulating sheet electrically insulating the heat radiation plate from an electronic component on the substrate,
wherein each of the heat radiation plate and the insulating sheet includes a hole through which the terminal of the image pickup device passes, and an inner wall of the hole does not contact a pin side wall of the terminal.

11. The apparatus of claim 10, wherein each of the substrate, the heat radiation plate and the insulating sheet includes one or more holes, and positions of the holes of the substrate, the heat radiation plate and the insulating sheet are coincident to each other.

12. The apparatus of claim 11, wherein a diameter of the one or more holes of the insulating sheet is smaller than a diameter of the one or more holes of the substrate and a diameter of the one or more holes of the heat radiation plate.

13. The apparatus of claim 10, wherein an area of the one or more holes of the insulating sheet is smaller than an area of the one or more holes of the heat radiation plate.

14. The apparatus of claim 10, wherein a thickness of the heat radiation plate satisfies at least (thickness of the heat radiation plate)>=(effective length of a pin of the terminal)−(thickness of the substrate)−(thickness of the insulating sheet)—(protrusion length of the pin of the terminal with respect to the substrate).

15. The apparatus of claim 10, wherein a partial area of a contact surface of the substrate contacts the heat radiation plate.

16. The apparatus of claim 15, wherein the partial area includes a hole connected to at least a portion of a terminal of the image pickup device, the portion of the terminal outputting an image signal.

17. The apparatus of claim 15, wherein the partial area includes an area formed when an output stage amplifier of the image pickup device is projected on the surface of the substrate.

18. The apparatus of claim 10, wherein the heat radiation plate is an electrogalvanized sheet steel.

* * * * *